(No Model.)
E. J. KELLY.
BALL BEARING.
No. 573,982.                    Patented Dec. 29, 1896.
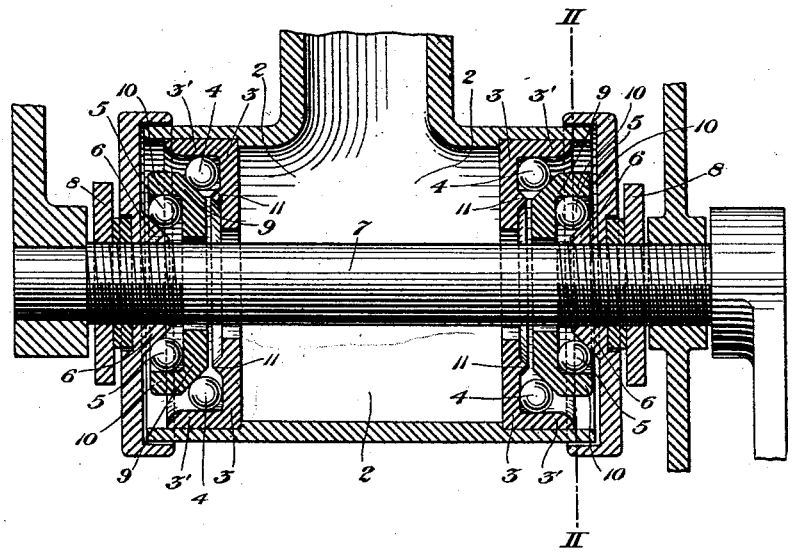
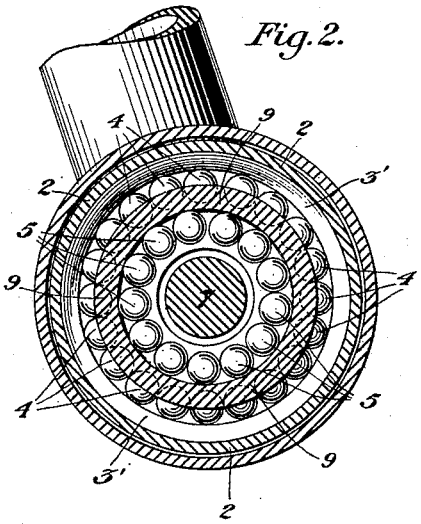
WITNESSES:
Peter J. Edwards
W. J. Shepard
INVENTOR
Edward J. Kelly
BY
C. M. Clarke
ATTORNEY.
THE NORRIS PETERS CO., PHOTO-LITHO., WASHINGTON, D. C.

UNITED STATES PATENT OFFICE.

EDWARD J. KELLY, OF MONONGAHELA CITY, PENNSYLVANIA.

BALL-BEARING.

SPECIFICATION forming part of Letters Patent No. 573,982, dated December 29, 1896.

Application filed March 13, 1896. Serial No. 583,048. (No model.)

*To all whom it may concern:*

Be it known that I, EDWARD J. KELLY, a citizen of the United States, residing at Monongahela City, in the county of Washington and State of Pennsylvania, have invented or discovered a new and useful Improvement in Ball-Bearings, of which the following is a full, clear, and exact description, reference being had to the accompanying drawings, forming part of this application, in which—

Figure 1 is a longitudinal section through the crank-axle of a bicycle furnished with my improved multiple ball-bearing. Fig. 2 is a cross-section on the line II II of Fig. 1. Fig. 3 is a partial longitudinal section similar to Fig. 1, but showing an additional row of balls.

Similar numerals or reference refer to like parts wherever used throughout this specification.

My invention consists of an improvement in ball-bearings for bicycles, vehicles, machinery, or any other apparatus or device in which such bearings are suitable; and it consists in two or more rows of balls placed between the stationary and moving parts of the bearing, separated by intervening dividing-walls or bearing-plates which serve as auxiliary bearings on each side of the plates, formed to constitute circular bearing-tracks and pockets for the balls. When so made and placed in position, these plates are carried around with the balls, assuming a speed which is a mean between the stationary bearing and that of the main moving bearing. By interposing such auxiliary bearings between the balls I secure a much more perfect action of the balls by overcoming any friction due to binding of the parts, and in action the bearing and rotation of the parts is assisted by means of the plurality of rows of balls, thus compensating in one row for any tendency to bind in the others.

Referring now to the drawings, 2 is the stationary frame of a bicycle, within the ends of which are secured the cup-shaped bearings 3, having flanges 3', in which run the rows of balls 4. An inner row of balls 5 rests against the faces of the adjusting-ring 6, screw-threaded on the crank-axle 7 and held against movement by lock-nuts 8. Between the rows of balls 4 and 5 is an intervening bearing-plate 9 of a proper shape to present its faces to the balls at an angle to secure the best results, and this plate constitutes the valuable feature of my invention, as by its use the friction is reduced to a minimum, as described.

For the purpose of isolating each row of balls to facilitate putting the various parts together circular external flanges 10 and ridges 11 are formed on the plates beyond the first intermediate plate, which serve to retain the balls in proper position until the various parts are adjusted to position ready for operation, the flanges 10 serving also to retain the balls when in action.

It is obvious that more than two rows of balls may be used, and I have illustrated in Fig. 3 a modified construction in which three rows of balls 4 4' 5 are employed, and an additional intervening bearing-plate 9', made similar to the plate 9 and in operation serving the same purpose.

By multiplying the intermediate bearing-plates in this manner very good results as to reduction of friction may be obtained, each successive plate moving at a proportionately slower rate of speed and resulting in a consequent reduction of friction to a minimum. In the forms of construction shown in the drawings the opposing faces of the various bearing-plates are shown at an angle of forty-five degrees, but while good results may be had at such an angle there are advantages of construction in securing compactness and reduction of size either in the diameter or length of the bearing by making such angles more flat or obtuse, as desired. An especial advantage in this mode of construction, employing several rows of balls and intervening plates, is that all of the balls and plates may be adjusted by setting in or out the outside plate, as in an ordinary ball-bearing. Two such adjustments may be had, one on each side, or if desired only one may be used, with equally good results, and this feature of adjustment constitutes an important feature of my invention.

The advantages of my invention will be appreciated by those skilled in the art to which it appertains. It is capable of wide application in many forms of machinery, vehicles, &c., and while I have shown it as applied to a bicycle I do not wish to be confined to such application, although in such application its use may be extended not only to the main-shaft bearing but to the rear and front wheels as well, while good results may be had by employing it in the pedals.

Changes and modifications may be made in the construction and operation by the skilled mechanic without departing from my invention, as I do not wish to be confined to the construction shown in the drawings, but to include any equivalent therefor.

Having described my invention and in what manner it is made and operates, what I claim, and desire to secure by Letters Patent, is—

1. In a ball-bearing, a bearing-plate provided with an external annular inclosing flange, as 3', constituting a bearing-face, and an internal annular retaining-ridge, as 11, constituting a non-bearing face, substantially as set forth.

2. In a ball-bearing, the combination with one or more rows of balls and their bearings, of a bearing-plate provided with an external annular inclosing flange constituting a bearing-face, and an internal annular retaining-ridge, constituting a non-bearing face, substantially as set forth.

In testimony whereof I have hereunto set my hand this 4th day of February, 1896.

EDWARD J. KELLY.

Witnesses:
PETER J. EDWARDS,
C. M. CLARKE.